United States Patent
Jin et al.

(10) Patent No.: US 11,081,957 B2
(45) Date of Patent: Aug. 3, 2021

(54) POWER CONVERTER WITH MULTI-MODE TIMING CONTROL

(71) Applicant: Texas Instruments Incorporated, Dallas, TX (US)

(72) Inventors: Guofeng Jin, Shanghai (CN); Yueming Sun, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 11 days.

(21) Appl. No.: 16/781,680

(22) Filed: Feb. 4, 2020

(65) Prior Publication Data

US 2020/0228009 A1 Jul. 16, 2020

Related U.S. Application Data

(63) Continuation of application No. 16/425,353, filed on May 29, 2019, now Pat. No. 10,608,532.

(30) Foreign Application Priority Data

Jan. 14, 2019 (WO) ................ PCT/CN2019/071565

(51) Int. Cl.
*H02M 3/156* (2006.01)
*H02M 1/14* (2006.01)
(Continued)

(52) U.S. Cl.
CPC ............. *H02M 3/156* (2013.01); *H02M 1/08* (2013.01); *H02M 1/14* (2013.01); *H02M 2001/0009* (2013.01)

(58) Field of Classification Search
CPC .. H02M 3/156–158; H02M 1/08; H02M 1/14; H02M 2001/0009
(Continued)

(56) References Cited

U.S. PATENT DOCUMENTS 6,972,548 B2 * 12/2005 Tzeng ............... H02M 1/15
323/282
7,071,665 B2 * 7/2006 Tzeng ............... H02M 1/15
323/271
(Continued)

FOREIGN PATENT DOCUMENTS

CN     101034851 A    9/2007
CN     101505096 A    8/2009
(Continued)

OTHER PUBLICATIONS

Search Report for PCT Application No. PCT/CN2019/071565, date of mailing of the international search report Oct. 16, 2019, 3 pages.
(Continued)

*Primary Examiner* — Yemane Mehari
(74) *Attorney, Agent, or Firm* — Lawrence J. Bassuk; Charles A. Brill; Frank D. Cimino (57) ABSTRACT

A converter circuit includes a power stage circuit configured to convert an input voltage to an output voltage provided at an output, and a control circuit configured to control the power stage circuit. The control circuit is configured to operate in one of a pulse frequency modulation ("PFM") mode and a pulse width modulation ("PWM") mode depending on a current supplied to the output. The control circuit includes a multi-mode timer circuit configured to provide a switching signal to set an off time for each switching cycle of the power stage circuit during the PFM mode and during the PWM mode.

20 Claims, 5 Drawing Sheets

(51) Int. Cl.
*H02M 1/08* (2006.01)
*H02M 1/00* (2006.01)

(58) Field of Classification Search
USPC .................................................. 323/282–285
See application file for complete search history.

(56) References Cited

U.S. PATENT DOCUMENTS

| | | | |
|---|---|---|---|
| 7,116,089 B1 * | 10/2006 | Nguyen | H02M 3/156 323/284 |
| 8,427,123 B2 | 4/2013 | Dearborn | |
| 9,071,125 B2 * | 6/2015 | Michishita | H02M 3/156 |
| 9,362,820 B2 | 6/2016 | Ito et al. | |
| 9,722,482 B2 * | 8/2017 | de Cremoux | H02M 3/157 |
| 2015/0035511 A1 * | 2/2015 | Mei | H02M 3/156 323/284 |
| 2019/0109530 A1 | 4/2019 | Perreault et al. | |

FOREIGN PATENT DOCUMENTS

| | | |
|---|---|---|
| CN | 101540542 A | 9/2009 |
| CN | 102449894 A | 5/2012 |
| CN | 104485823 A | 4/2015 |
| JP | H1189222 A | 3/1999 |

OTHER PUBLICATIONS

CN101540542A, Machine Translation, 16 pages.
CN104485823A, Machine Translation, 12 pages.
CN101505096A, Machine Translation, 10 pages.

* cited by examiner

POWER CONVERTER WITH MULTI-MODE TIMING CONTROL

CROSS REFERENCES TO RELATED APPLICATIONS

Under 35 U.S.C. § 120, this continuation application claims benefits of and priority to U.S. patent application Ser. No. 16/425,353 (TI-78650), filed on May 29, 2019, which is a continuation of PCT Application No. PCT/CN2019/071565, filed Jan. 14, 2019. The above referenced applications are hereby incorporated herein by reference in their entirety.

TECHNICAL FIELD

This disclosure relates to integrated circuits and, more particularly, to a power converter with multi-mode timing control.

BACKGROUND

Switched-mode direct current to direct current (DC-DC) converters represent a primary category for power supply design. For example, a switched-mode DC-DC converter may exceed ninety percent power conversion efficiency and thus has been widely used to supply power in all types of electronic devices, such as computers, cell phones, televisions, and so forth. In a switched-mode DC-DC converter, the control loop design determines certain performance parameters of the converter, such as may include switching operation between Pulse Width Modulation ("PWM") and Pulse Frequency Modulation ("PFM") modes.

SUMMARY

In one example, a converter circuit includes a power stage circuit configured to convert an input voltage to an output voltage provided at an output, and a control circuit configured to control the power stage circuit. The control circuit is configured to operate in one of a pulse frequency modulation ("PFM") mode and a pulse width modulation ("PWM") mode depending on a current supplied to the output relative to a predefined threshold. The control circuit includes a multi-mode timer circuit configured to provide a switching signal to set an off time for each switching cycle of the power stage circuit, the multi-mode timer circuit configured to set the off time during the PFM mode based on the input voltage, the output voltage and the current supplied to the output when the current supplied to the output is below the predefined threshold and configured to set the off time during the PWM mode based on the input voltage and the output voltage when the current supplied to the output is above the predefined threshold.

In another example, a converter circuit includes a power stage circuit coupled between an input and an output of the converter circuit, the power stage circuit including a control input. The converter circuit further includes a driver circuit coupled to the control input. The converter circuit further includes a feedback circuit. The feedback circuit includes an error amplifier coupled to a feedback voltage and a reference voltage. The feedback circuit further includes a voltage controlled current source coupled to an output of the error amplifier. The feedback circuit further includes a constant current source coupled in parallel to the voltage controlled current source. The feedback circuit further includes a current comparator including a first comparator input coupled to outputs of the voltage controlled current source and the constant current source and a second comparator input coupled to a sensed current. The converter circuit further includes a multi-mode timer circuit coupled to the output of the error amplifier and to each of the input and output of the converter circuit. The converter circuit further includes a pulse circuit comprising inputs coupled to an output of the multi-mode timer circuit and coupled to an output of the current comparator, and having an output coupled to an input of the driver circuit.

In yet another example, an integrated circuit device includes a feedback control circuit configured to generate an error signal based on the output voltage. The integrated circuit device further includes a multi-mode timer circuit configured to provide a switching signal to control a switching cycle based on the input voltage, the output voltage and a current supplied to the output, the multi-mode timer circuit configured to operate in a pulse frequency modulation ("PFM") mode responsive to the current supplied to the output being below a predefined threshold, and configured to operate in a pulse width modulation ("PWM") mode responsive to the current supplied to the output being above the predefined threshold. The integrated circuit device further includes a pulse circuit configured to generate a series of pulses based on the error signal and the switching signal.

DETAILED DESCRIPTION

This disclosure relates to a power converter with multi-mode timing control. The circuits and methods thus can provide a multi-mode DC-DC converter circuit that is able to seamlessly transition between Pulse Width Modulation ("PWM") and Pulse Frequency Modulation ("PFM") modes.

For example, a converter circuit includes a multi-mode timer for controlling a switching cycle. The multi-mode timer is configured to perform a time-off calculation to set an off time of each switching cycle in PWM and PFM modes. In the PWM mode the off time is based on an input voltage and an output voltage. The multi-mode timer is configured to determine the off time for each switching cycle in PFM mode based on the input voltage, output voltage and load current. Thus, as the load current decreases, the converter can seamlessly transition from PWM mode to PFM mode according to the switching cycle that is controlled by the multi-mode timer. Similarly, as load current increases, the converter can seamlessly transition from PFM mode to PWM mode. As a result, the multi-mode timer enables the converter to deliver a consistent DC voltage while mitigating frequency jitter or voltage ripple at the output during transitions between PWM and PFM modes.

Figure 1:
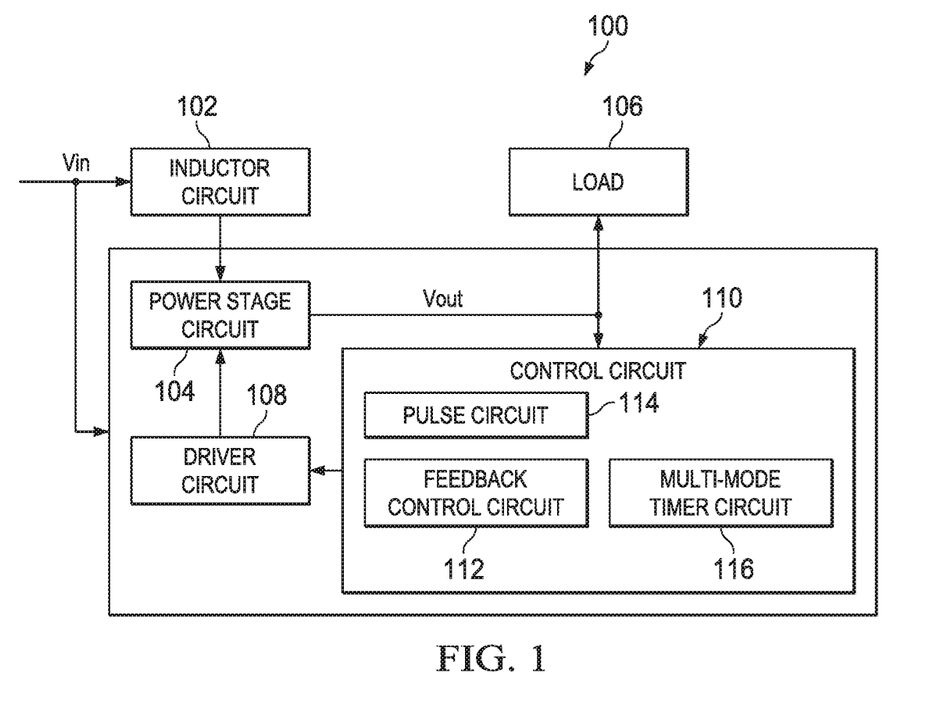
FIG. 1 illustrates an example schematic block diagram of a multi-mode converter circuit.

FIG. 1 illustrates an example schematic block diagram of a multi-mode converter circuit (hereinafter "converter circuit") 100. As used herein, for example, the term circuit can include a collection of active and/or passive elements that perform a circuit function such as an analog circuit or control circuit. Additionally, or alternatively, the term circuit can include an integrated circuit (IC) where all and/or some of the circuit elements are fabricated on a common substrate, such as a semiconductor device (e.g., IC chip). In the following examples, the converter circuit is described as a DC-DC converter; however, in other examples it may be implemented in other converter topologies.

The converter circuit 100 includes an inductor circuit 102 configured to receive an input voltage. In one example, the inductor circuit 102 can be provided externally to the converter circuit 100. In other examples, the inductor circuit 102 can be internal and integrated with the converter circuit 100. A power stage circuit 104 is configured to convert the input voltage (e.g., a DC voltage) to provide an output voltage (e.g., another DC voltage) to an output to which a load 106 can be connected. For example, the output voltage may be less than or greater than the input voltage according to the type of converter. A driver circuit 108 is configured to drive the power stage circuit 104 in response to a control signal. For example, the control signal is provided as a series of pulses, such as a pulse width modulated ("PWM") signal or a pulse frequency modulated ("PFM") signal.

A control circuit 110 is configured to generate the control signal (a pulsed signal) to control the driver circuit 108 for driving the power stage circuit 104, which supplies a corresponding regulated voltage to the load. The control circuit 110 includes a feedback control circuit 112 configured to generate a feedback signal based on the output voltage. For example, the feedback control circuit 112 compares a feedback voltage, corresponding to the current supplied to the output, with a reference voltage to produce an output signal. The control circuit 110 further includes a multi-mode timer circuit 116 configured to provide a switching control signal to control an off-time of each switching cycle based on the input voltage, the output voltage, and based on current at the load 106. The multi-mode timer circuit 116 is configured to operate the converter circuit 100 in multiple modes, such as PFM and PWM modes, in response to the magnitude of the load current. For example, the multi-mode timer circuit 116 is configured to operate the circuit 100 in the PFM mode when the current at the load 106 is below a predefined threshold, and is configured to operate in the PWM mode when the current at the load 106 is above the predefined threshold.

PWM and PFM both refer to types of digital pulse switching methods used to control the amount of power supplied to a load from a power source. The voltage delivered to the load is determined by switching the power stage circuit 104 between on and off states based on the control signal (from control circuit 110). In a PWM mode, the width of the pulses is varied at a constant frequency to vary the duty cycle. In a PFM mode, the width of the pulses is fixed while the frequency is varied over time. For certain applications, such as with light loads, PFM mode is beneficial while for other applications, such as with heavy loads, PWM mode is beneficial.

The control circuit 110 further includes a pulse circuit 114 configured to generate the control signal (e.g., signal pulses) to control the driver circuit 108 based on the output signal from the feedback control circuit 112 and based on the switching control signal. Thus, the input pulses to the driver circuit 108 have an off time that is controlled according to which of the PWM and PFM mode is active (e.g., controlled by the multi-mode timer circuit 116). For example, in the PWM mode, the multi-mode timer circuit 116 sets the off time based on the input voltage and the output voltage. In the PFM mode, the multi-mode timer circuit 116 sets the off time for the input pulses based on the input voltage, the output voltage and the current at the output.

Thus, by utilizing the multi-mode timer circuit 116 to control the off time of the input pulses to the driver circuit 108, the converter circuit 100 is able to seamlessly transition between PWM and PFM modes, depending on the load condition, while mitigating frequency jitter or voltage ripple at the output during the mode transitions.

Figure 2:
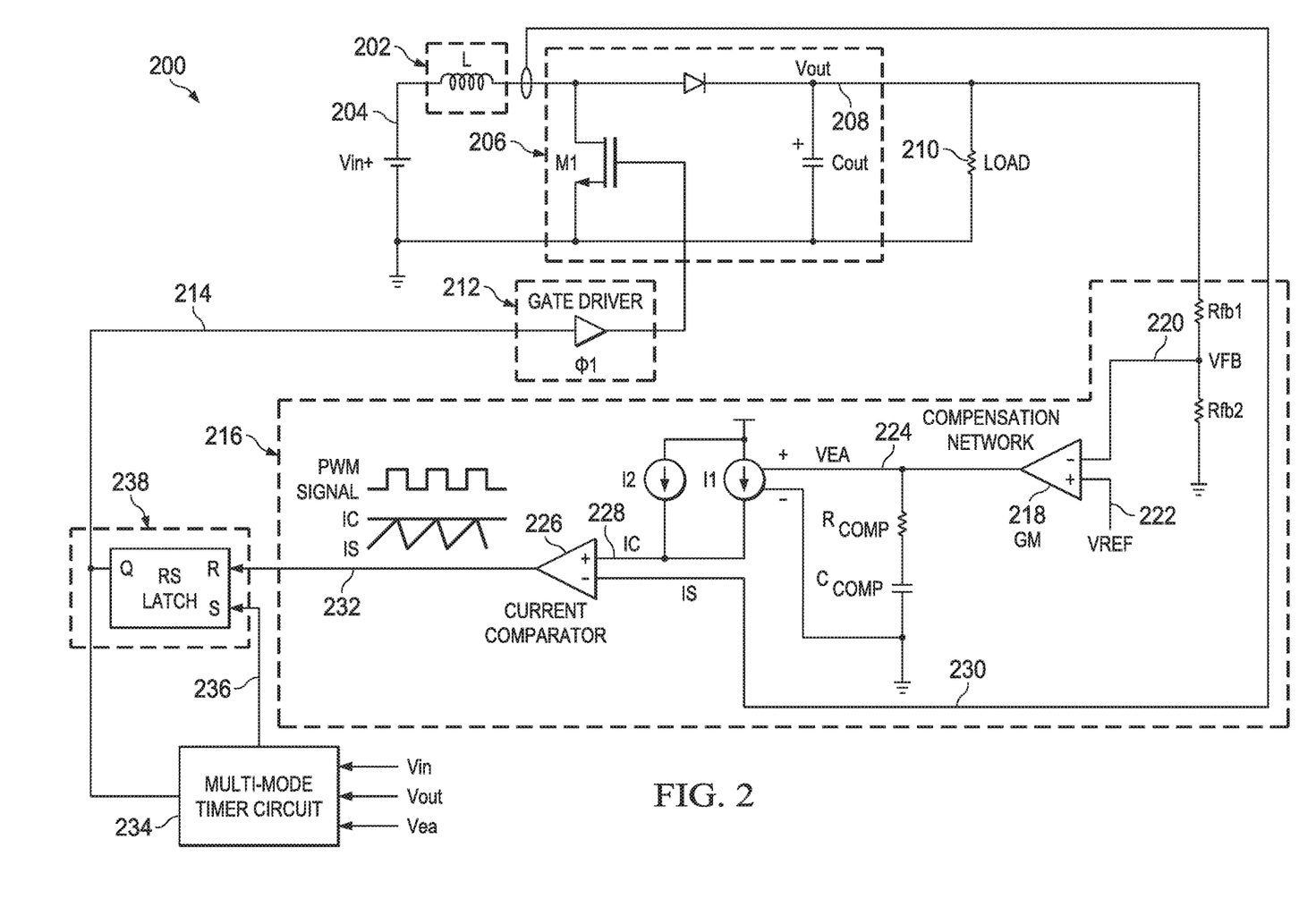
FIG. 2 illustrates an example circuit diagram of a multi-mode DC-DC converter circuit.

FIG. 2 illustrates an example circuit diagram of a converter circuit 200 (e.g., corresponding to the converter circuit 100 of FIG. 1). An inductor circuit 202 includes an inductor L that is coupled to receive an input voltage $V_{in}$ at a corresponding inductor circuit input 204. A power stage circuit 206 converts the input voltage $V_{in}$ to provide an output voltage $V_{out}$ at a power stage output 208 to which a load 210 is connected. For example, the power stage circuit 206 and the inductor circuit 202 may be configured as a DC-DC converter to buck or boost the input voltage $V_{in}$ to the output voltage $V_{out}$. In the example illustrated, the power stage circuit 206 and the inductor circuit 202 are configured as a boost DC-DC converter. In this example, an output capacitor $C_{out}$ is connected in parallel with the load 210. The power stage circuit 206 includes one or more switch devices (e.g., demonstrated as field effect transistor device M1). The power stage circuit 206 is configured to activate and deactivate M1 based on drive signal. A driver circuit 212 (e.g. a gate driver) is connected to drive the power stage circuit 206 based on a switching control (e.g., PWM signal or PFM signal) 214 generated by a feedback control circuit 216. The feedback control circuit 216 is configured to generate the control signal at 232 based on the output voltage $V_{out}$ and a sensed current signal $I_s$ through the inductor circuit 202.

As an example, the feedback control circuit 216 includes an error amplifier 218 that compares a feedback voltage $V_{FB}$ at a first error amplifier input 220 with a reference voltage $V_{REF}$ received at another error amplifier input 222 to produce an error amplifier output voltage $V_{ea}$ at an error amplifier output 224. The reference voltage can be set to a desired DC voltage. For example, the feedback voltage $V_{FB}$ is generated by a divider circuit connected in parallel with the load 210, such as a resistive-divider formed by resistors Rfb1 and Rfb2 connected in series between the output voltage $V_{out}$ and ground.

The error amplifier output voltage $V_{ea}$ at the error amplifier output 224 drives a voltage controlled current source $I_1$, which is added to a constant current source $I_2$ to form a command current $I_c$ (e.g., a variable DC current). A compensation network, including compensation resistor $R_{comp}$ connected in series with compensation capacitor $C_{comp}$, helps to adjust and stabilize the error amplifier output voltage $V_{ea}$.

A current comparator circuit 226 compares a command current $I_c$ at a non-inverting input 228 with a sensed current signal $I_s$ provided to an inverting input 230. The current comparator circuit 226 provides a pulsed signal at a current comparator output 232 based on the sensed current signal $I_s$ relative to the command current $I_c$.

A multi-mode timer circuit 234 is coupled to receive the input voltage $V_{in}$, the output voltage $V_{out}$, and the error amplifier output voltage $V_{ea}$. The amplifier output voltage $V_{ea}$ is representative of the current at the output 208 that is supplied to the load 210. Based on these inputs, the multi-mode timer circuit 234 is configured to calculate an off time and to provide a switching control signal at a timer circuit output 236. The multi-mode timer circuit 234 is configured to supply the switching control signal to the pulse circuit 238 to control the off time of the power stage circuit 206 for each switching cycle. The multi-mode timer circuit 234 is configured to operate the converter in multiple modes. For example, the multi-mode timer circuit 234 is configured to operate the converter in a PFM mode when the current at the load 210 is below a predefined threshold, and is configured to operate the converter in a PWM mode when the current at the load 210 is above the predefined threshold. For example, the multi-mode timer circuit 234 is configured to set the off time during the PFM mode based on the input voltage $V_{in}$, the output voltage $V_{out}$, and the output current when the current supplied to the output is below the predefined threshold. The multi-mode timer circuit 234 is further configured to set the off time during the PWM mode based on input voltage $V_{in}$ and the output voltage $V_{out}$ when the current supplied to the output is above the predefined threshold.

A pulse circuit 238 is configured to generate input pulses to control the driver circuit 212. The pulse circuit 238 is configured as a buffer circuit (e.g., a set-reset (SR) latch) to generate a sequence of pulses having on and off times based on the feedback signal at the current comparator output 232 received at the reset input R and based on the switching signal at the timer circuit output 236 received at the set input S. The pulse circuit 238 thus provides the signal pulses at its Q output with an on time that is based on the comparator signal that is latched in according to the switching signal. The off time of each signal pulse is based on the switching control signal at 236. In this way, the pulse circuit 238 controls the driver 212 to, in turn, control the on and off timing of the transistor $M_1$ based on a measurement of the current though the inductor L relative to the command current $I_c$. Since the drive pulse on and off times are incrementally adjusted over each switching cycle based on the current at the load 210, jitter and voltage ripple in the DC output voltage at the 208 are mitigated, including during transitions between PWM and PFM modes. Thus, as disclosed herein, the converter 200 is able to seamlessly transition between a PWM and PFM modes.

The converter circuit 200 can be implemented as an IC semiconductor chip device that interfaces with external components. For example, the converter circuit 200 may be implemented in an IC chip as including a subset of the components, namely, the power stage circuit 204, the feedback control circuit 216, the pulse circuit 238 and the gate driver 238, as described herein. In another example, the IC chip containing the converter circuit 200 may also include the inductor circuit 202 and/or the output capacitor $C_{out}$.

Figure 3:
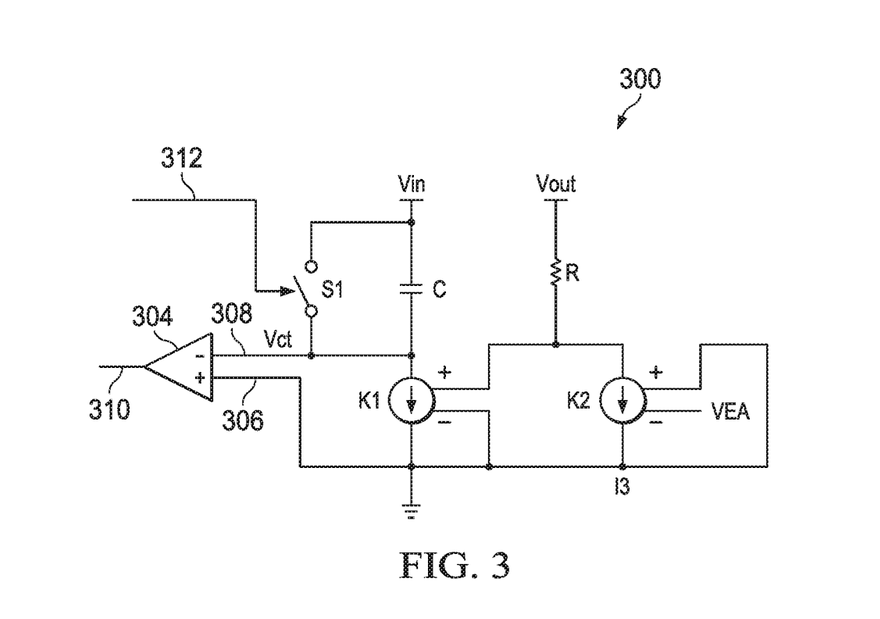
FIG. 3 illustrates an example circuit diagram of a multi-mode timer circuit of the multi-mode DC-DC converter circuit of FIG. 2.

FIG. 3 illustrates an example of a multi-mode timer circuit 300 (e.g., multi-mode timer circuit 116 of FIG. 1 and multi-mode timer circuit 234 of FIG. 2). The multi-mode timer circuit 300 includes a voltage comparator 304 includes an inverting input 308 coupled to receive a control voltage $V_{ct}$ at a first terminal of a voltage controlled current source $K_1$. The voltage comparator 304 also includes a non-inverting input 306 coupled to another terminal of the current source that is grounded in this example. The current source K1 has a first input coupled to the output voltage $V_{out}$ via a resistor R. The first input of current source K1 is also coupled to an output of another voltage controlled current source K2. The voltage controlled current source K2 thus supplies (e.g., sinks) current with respect to the first input of current source K1 based on an error amplifier output voltage $V_{ea}$ (e.g., output of error amplifier 218 in FIG. 2), as disclosed herein. The voltage comparator 304 provides a switching signal at a voltage comparator output 310 based on the input voltage $V_{in}$, the output voltage $V_{out}$ and the error amplifier output voltage $V_{ea}$.

As described, the output voltage of an error amplifier is used by the timer circuit to control the operating mode of the converter. For example, in response to the feedback voltage being less than the reference voltage, the output signal of the error amplifier 218 is greater than a predetermined threshold voltage such as zero ($V_{ea}$>0) and the current source is deactivated (e.g., I3=0). In this example, the timer circuit 300 operates the converter in the PWM mode. For example, the multi-mode mode timer control circuit 300 calculates the switch-off time $T_{off}$ of the control signal based on the input voltage $V_{in}$ and the output voltage $V_{out}$, such as according to the following equation:

$$T_{off}=(C \times V_{in})/(K_1 \times V_{out}) \quad \text{(Eq. 1)}$$

In order to enable the multi-mode timer circuit 300 to extend off time during PFM mode and to transition automatically between PWM and PFM modes, the current source K2 is activated if the output signal of the error amplifier 218 is less than a threshold voltage such as zero ($V_{ea}$<0). For example, the comparator 304 produces the switching signal at the voltage comparator output 310 to be inversely proportional to the error amplifier output voltage $V_{ea}$ when the error amplifier output voltage $V_{ea}$ is below the threshold, corresponding to a light load condition. For example, in response to the error amplifier output voltage $V_{ea}$ decreasing below the threshold (e.g., because of a smaller load), the peak inductor current is also clamped. However, the switch-off time $T_{off}$ of the duty cycle represented by the switching signal is prolonged. For example, the switch-off time $T_{off}$ of the switching signal is calculated by the multi-mode timer circuit 300, such as according to the following equation:

$$T_{off}=(C \times V_{in})/(K_1 \times (V_{out}-R \times I_3)) \quad \text{(Eq. 2)}$$

where:
$I_3$=0 when $V_{ea}$>zero;
and
$I_3$=$K_2 \times V_{ea}$ when $V_{ea}$<zero;

In other words, when the error amplifier output voltage $V_{ea}$ is above zero, the multi-mode timer circuit 300 operates in PWM mode and Eq. 2 reduces to Eq. 1. In situations, when a load current is low and therefore the error amplifier output voltage $V_{ea}$ is below zero, the multi-mode timer circuit 300 operates in the PFM mode. Moreover, as the error amplifier voltage may transition through zero, the converter can seamlessly transition between the PWM and PFM modes without separate circuitry. This means that the multi-mode timer circuit 300 is configured to provide the switching signal to control the off time of the pulse circuit, which in turn controls the driver circuit 212, both when the pulse circuit is generating PWM control signals or PFM control signals. As a result of the configuring the timer circuit in this way, jitter and output voltage ripple can be mitigated. Additionally, since separate circuitry is not utilized for each of the PWM and PFM modes, the converter can be manufactured with reduced cost compared to designs that implement separate controls for each mode.

Figure 4:
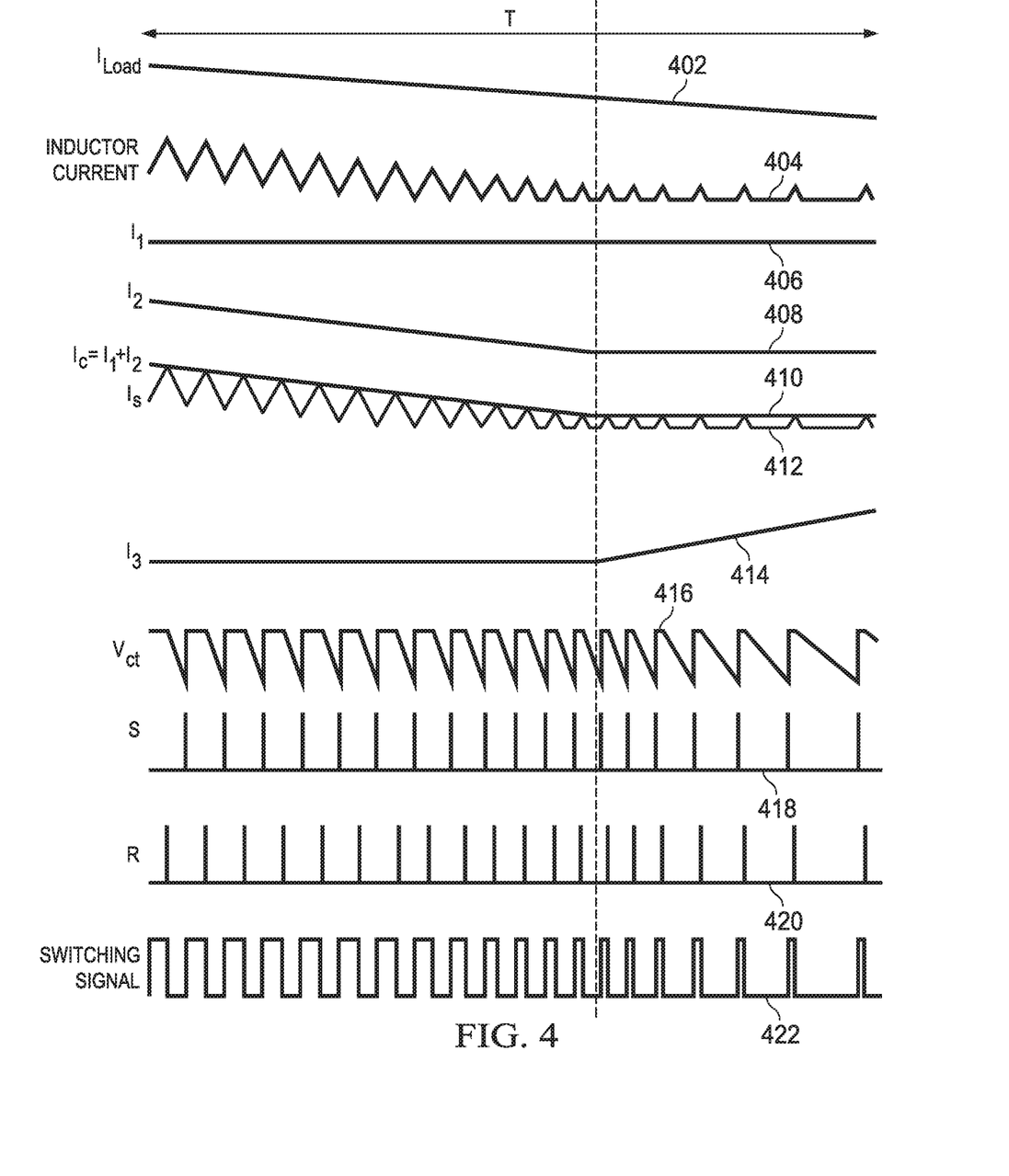
FIG. 4 illustrates example timing diagram for signals in the converter circuit of FIG. 2 and the multi-mode timer circuit of FIG. 3.

FIG. 4 illustrates example timing diagrams of the converter circuit 200 of FIG. 2 and the multi-mode timer circuit 300 of FIG. 3. The timing diagrams include a load current $I_{load}$ waveform 402, illustrated as decreasing over time T. Also illustrated is an inductor current waveform 404 decreasing over time T until the peak inductor current is clamped at a defined value. A constant current source $I_2$ waveform 406 and a voltage controlled current source $I_1$ waveform 408 are also included. As illustrated, the voltage controlled current source $I_1$ waveform 408, which is a function of an error amplifier output voltage $V_{ea}$, decreases as the error amplifier output voltage $V_{ea}$ approaches zero.

A command current $I_c$ waveform 410, or a sum of the current source $I_2$ waveform 406 and the voltage controlled current source $I_1$ waveform 408, is also shown. The waveforms further include a sensed current $I_s$ waveform 412.

A current $I_3$ generated by a current source controlled by the error amplifier output voltage $V_{ea}$ that is included in a timer circuit, such as the multi-mode timer circuit 300 of FIG. 3, is illustrated as a current $I_3$ waveform 414. As depicted by the current $I_3$ waveform 414, the current $I_3$ remains at zero while the load current $I_{load}$, depicted by load current $I_{load}$ waveform 402, remains high and the multi-mode timer circuit 300 continues to operate in a PWM mode. As further depicted by load current $I_{load}$ waveform 402, once the load current $I_{load}$ begins to drop below a threshold amount, the current $I_3$ begins to increase, enabling the multi-mode timer circuit 300 to seamlessly transition from the PWM mode to the PFM mode.

The waveforms further included a switched input voltage $V_{ct}$ waveform 416 (e.g., supplied to input 308 of timer circuit 300). A control signal received at a reset input R and a switching signal received at a set input S of a latch (e.g., latch 238) are illustrated as set input S waveform 418 and reset input R waveform 420, respectively. A switching signal generated (e.g., by pulse circuit 238) based on reset input R and set input S is illustrated as waveform 422.

Since, as disclosed herein, the converter provides constant DC output voltage while transitioning between operating in PFM and PWM modes and mitigating voltage ripple and switching frequency jitter, the mode transitions are referred to as seamless transitions between PFM and PWM modes. Such a seamless transition enables a converter circuit (i.e. the converter circuit 100 of FIG. 1 or the converter circuit 200 of FIG. 2) to function with high efficiency over a full load range.

Figure 5:
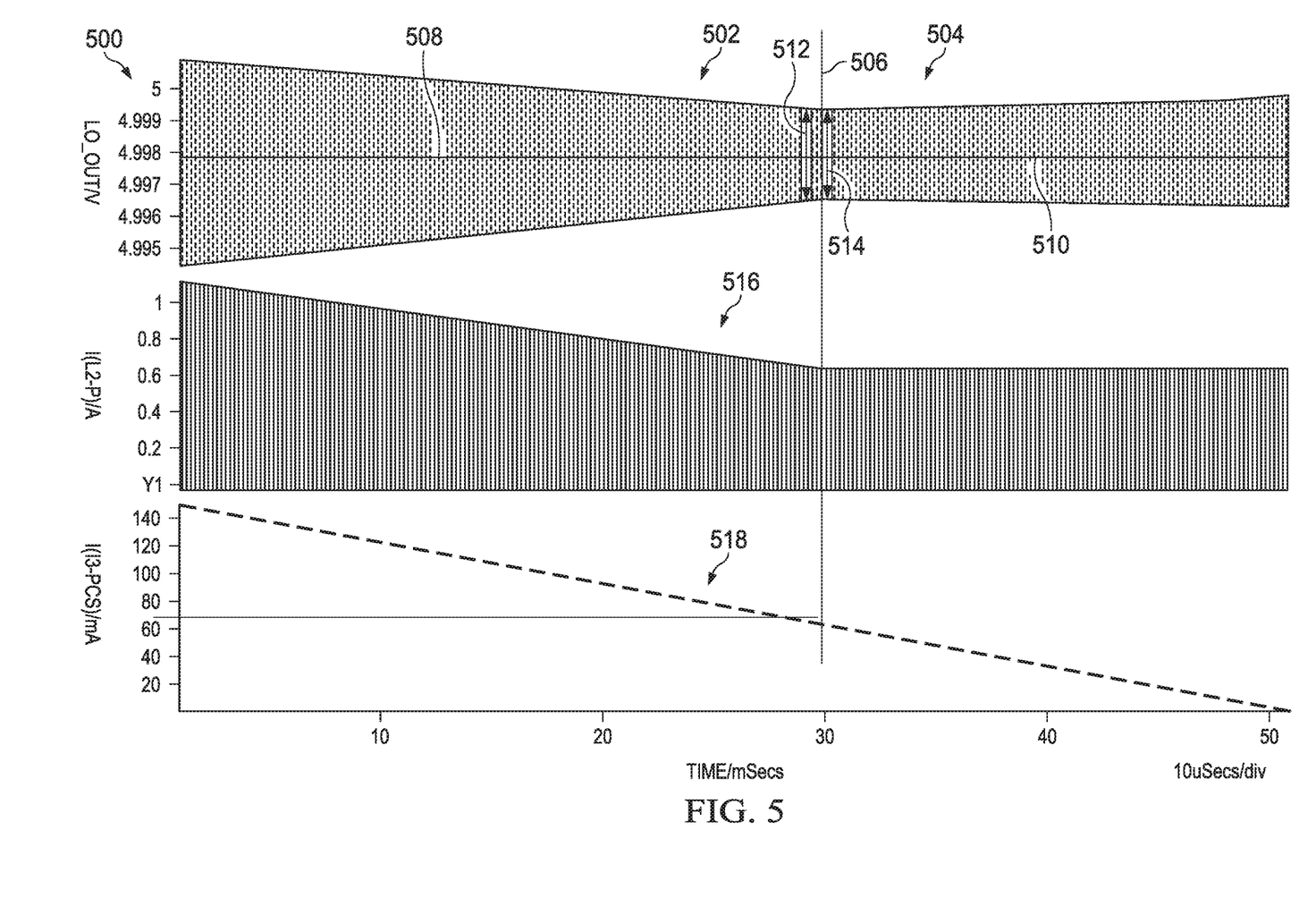
FIG. 5 illustrates an example diagram of signals from the converter circuit of FIG. 2 and the multi-mode timer circuit of FIG. 3

FIG. 5 demonstrates the transitioning between PWM and PFM mode. For example, the simulation diagram includes an output voltage waveform 500 representative of a voltage output produced by an example converter circuit (i.e. the converter circuit 100 of FIG. 1 or the converter circuit 200 of FIG. 2) having a multi-mode timer circuit (i.e. the multi-mode timer circuit 300 of FIG. 3). The output voltage waveform 500 includes a PWM portion 502 representing the multi-mode timer circuit operating in a PWM mode and a PFM portion 504 representing the multi-mode timer circuit operating in a PFM mode separated by a boundary line 506 representing a transition between PWM and PFM modes.

As illustrated, a PWM mode DC output voltage 508 remains constant during transition across the boundary line 506 to a PFM mode DC output voltage 510. Moreover, a PWM mode AC output voltage ripple 512 remains low even as the operation transitions across the boundary line 506 from PWM to a PFM mode AC output voltage ripple 514. The simulation diagram further represents an inductor current waveform 516 illustrating an inductor current decreasing as a load current 518 decreases. When a load current reaches a threshold level, indicated by the boundary line 506, the inductor current is clamped in PFM mode, as illustrated by the inductor current waveform 516 remaining constant over time after the boundary line 506.

Figure 6:
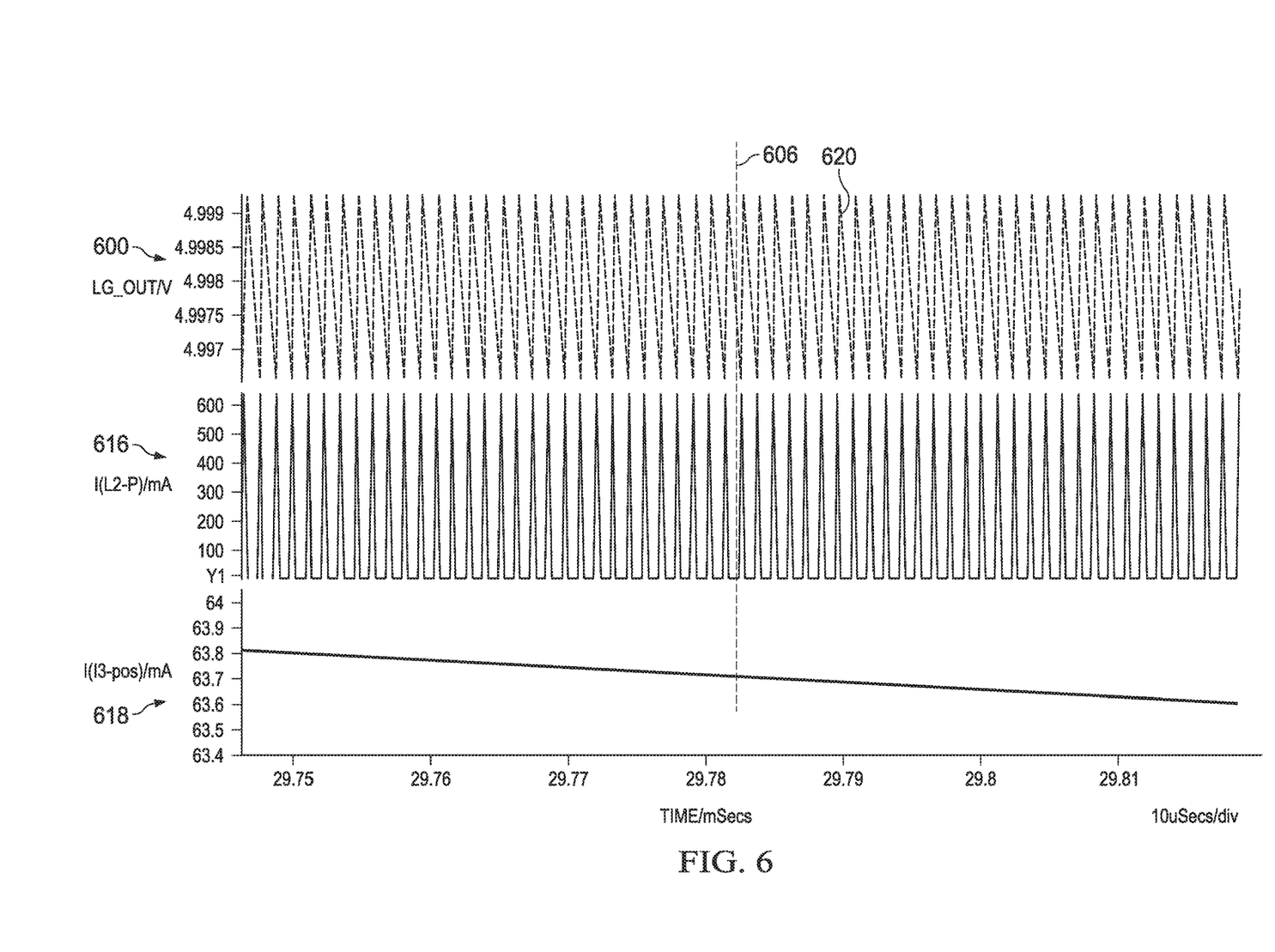
FIG. 6 illustrates close-up view of a portion of the diagram of FIG. 5.

FIG. 6 illustrates an enlarged view of the simulation diagrams illustrated in FIG. 5 with particular focus around a boundary line 606. For example, the simulation diagram includes close up views of an output voltage waveform 600, an inductor current waveform 616, and a load current waveform 618. As illustrated, a switching frequency 620 remains constant during transition across the boundary line 606.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus comprising:
    a timer circuit having a first input configured to receive an input voltage of a power converter, a second input configured to receive an output voltage of the power converter, a third input configured to receive an error signal indicative of a difference between the output voltage and a reference voltage, the timer circuit having:
        a first voltage control current source configured to conduct, via a first node, a first current based on the error signal;
        a second voltage control current source configured to conduct, via a second node, a second current based on a voltage of the first node; and
        a comparator having a first input coupled to the second node, a second input coupled to a ground terminal, and a comparator output configured to provide a switching signal for the power converter.

2. The apparatus of claim 1, wherein the timer circuit includes a resistor having a first terminal coupled to receive the output voltage via the second input, and a second terminal coupled to the first node.

3. The apparatus of claim 1, wherein the timer circuit includes a capacitor having a first plate coupled to receive the input voltage via the first input, and a second plate coupled to the second node.

4. The apparatus of claim 1, wherein the timer circuit includes a switch having a first end coupled to the first terminal, a second end coupled to the second node, and a control input configured to receive a pulse modulation signal from a latch.

5. The apparatus of claim 1, further comprising:
    a current comparator having a first input configured to receive a command current representative of the error signal, a second input configured to receive a sensed current representative of an output current of the power converter, and a current comparator output; and
    a set-reset (SR) latching having a reset input coupled to the current comparator output, a set input coupled to receive the switching signal from the timer circuit, and a latch output.

6. The apparatus of claim 5, wherein the timer circuit includes:
- a resistor coupled between the second input and the first node;
- a capacitor coupled between the first input and the second node; and
- a switch coupled across the capacitor between the first input and the second node, the switch having a control terminal coupled to the latch output.

7. The apparatus of claim 5, further comprising:
- a constant current source configured to provide a constant current to the first input of the current comparator; and
- a variable current source configured to provide a variable current, based on the error signal, to the first input of the current comparator,
- wherein the command current is a sum of the constant current and the variable current.

8. The apparatus of claim 7, further comprising:
- an error amplifier having an amplified output configured to provide the error signal to a first input of the variable current source;
- a resistor having a first terminal coupled to the first input of the variable current source, and a second terminal; and
- a capacitor having a first plate coupled to the second terminal of the resistor, and a second plate coupled to the ground terminal and a second input of the variable current source.

9. An apparatus comprising:
a timer circuit having:
- a resistor including a first terminal configured to receive an output voltage of a power converter, and a second terminal coupled to a first node;
- a capacitor including a first plate configured to receive an input voltage of the power converter, and a second plate coupled to a second node;
- a first voltage control current source configured to conduct, via the first node, a first current based on an error signal indicative of a difference between the output voltage and a reference voltage;
- a second voltage control current source configured to conduct, via the second node, a second current based on a voltage of the first node; and
- a comparator having a first input coupled to the second node, a second input coupled to a ground terminal, and a comparator output configured to provide a switching signal for the power converter.

10. The apparatus of claim 9, wherein the voltage of the first node is inversely proportional to the error signal.

11. The apparatus of claim 9, further comprising:
- a current comparator having a first input configured to receive a command current representative of the error signal, a second input configured to receive a sensed current representative of an output current of the power converter, and a current comparator output; and
- a set-reset (SR) latching having a reset input coupled to the current comparator output, a set input coupled to receive the switching signal from the timer circuit, and a latch output.

12. The apparatus of claim 11, wherein the timer circuit includes a switch coupled across the capacitor and having a control terminal coupled to the latch output.

13. The apparatus of claim 11, further comprising:
- a constant current source configured to provide a constant current to the first input of the current comparator; and
- a variable current source configured to provide a variable current, based on the error signal, to the first input of the current comparator,
- wherein the command current is a sum of the constant current and the variable current.

14. The apparatus of claim 13, further comprising:
- an error amplifier having an amplified output configured to provide the error signal to a first input of the variable current source;
- a second resistor having a first terminal coupled to the first input of the variable current source, and a second terminal; and
- a second capacitor having a first plate coupled to the second terminal of the resistor, and a second plate coupled to a ground terminal and a second input of the variable current source.

15. A system comprising:
- a power converter configured to convert an input voltage to an output voltage based on a pulse modulation signal; and
- a control circuit including:
  - a resistor including a first terminal configured to receive the output voltage of the power converter, and a second terminal coupled to a first node;
  - a capacitor including a first plate configured to receive the input voltage of the power converter, and a second plate coupled to a second node;
  - a first voltage control current source configured to conduct, via the first node, a first current based on an error signal indicative of a difference between the output voltage and a reference voltage;
  - a second voltage control current source configured to conduct, via the second node, a second current based on a voltage of the first node;
  - a comparator having a first input coupled to the second node, a second input coupled to a ground terminal, and a comparator output configured to provide a switching signal for the power converter; and
  - a set-reset (SR) latching having a reset input, a set input coupled to receive the switching signal, and a latch output configured to provide the pulse modulation signal.

16. The system of claim 15, wherein the control circuit includes a switch coupled across the capacitor and having a control terminal coupled to the latch output.

17. The system of claim 15, wherein the voltage of the first node is inversely proportional to the error signal.

18. The system of claim 15, wherein the control circuit includes a current comparator having:
- a first input configured to receive a command current representative of the error signal;
- a second input configured to receive a sensed current representative of an output current of the power converter; and
- a current comparator output coupled to the reset input of the SR latch.

19. The system of claim 18, wherein the control circuit includes:
- a constant current source configured to provide a constant current to the first input of the current comparator; and
- a variable current source configured to provide a variable current, based on the error signal, to the first input of the current comparator,
- wherein the command current is a sum of the constant current and the variable current.

20. The system of claim 19, wherein the control circuit includes:

an error amplifier having an amplified output configured to provide the error signal to a first input of the variable current source;
a second resistor having a first terminal coupled to the first input of the variable current source, and a second terminal; and
a second capacitor having a first plate coupled to the second terminal of the resistor, and a second plate coupled to a ground terminal and a second input of the variable current source.

* * * * *